US011301535B2

(12) United States Patent
Haas et al.

(10) Patent No.: US 11,301,535 B2
(45) Date of Patent: Apr. 12, 2022

(54) SYSTEMS AND METHODS FOR DETERMINING A GEOGRAPHIC LOCATION

(71) Applicant: SAP SE, Walldorf (DE)

(72) Inventors: Nichole Haas, Monroe, WA (US); Anikate Singh, Bellevue, WA (US); Nicolas Patenode, Bellevue, WA (US); Rama Seera, London (GB); Robert Quanstrom, London (GB); Aster Anto, London (GB); Ketan Shrikhande, London (GB); Suresh Chinnaswamy, London (GB)

(73) Assignee: SAP SE, Walldorf (DE)

( * ) Notice: Subject to any disclaimer, the term of this patent is extended or adjusted under 35 U.S.C. 154(b) by 521 days.

(21) Appl. No.: 16/204,970

(22) Filed: Nov. 29, 2018

(65) Prior Publication Data
US 2020/0175085 A1   Jun. 4, 2020

(51) Int. Cl.
*G06F 16/9537* (2019.01)
*G06N 20/00* (2019.01)

(52) U.S. Cl.
CPC ......... *G06F 16/9537* (2019.01); *G06N 20/00* (2019.01)

(58) Field of Classification Search
None
See application file for complete search history.

(56) References Cited

U.S. PATENT DOCUMENTS

| 9,971,973 | B1* | 5/2018 | Smith | G06N 20/00 |
|---|---|---|---|---|
| 2012/0197802 | A1* | 8/2012 | Smith | G06Q 20/388 |
| | | | | 705/44 |
| 2013/0085902 | A1* | 4/2013 | Chew | G06Q 40/12 |
| | | | | 705/30 |
| 2014/0095509 | A1* | 4/2014 | Patton | G06F 16/29 |
| | | | | 707/740 |
| 2014/0379497 | A1* | 12/2014 | Varma | G06Q 20/202 |
| | | | | 705/14.73 |
| 2017/0039245 | A1* | 2/2017 | Wholey, III | G06F 16/9024 |
| 2018/0053188 | A1* | 2/2018 | Zoldi | G06Q 20/4016 |
| 2018/0143986 | A1* | 5/2018 | Sinha | G06Q 30/0242 |
| 2019/0073676 | A1* | 3/2019 | Wang | G06Q 50/01 |
| 2020/0118071 | A1* | 4/2020 | Venkatesan | G06N 7/005 |

* cited by examiner

*Primary Examiner* — Richard L Bowen
(74) *Attorney, Agent, or Firm* — Fountainhead Law Group P.C.

(57) ABSTRACT

In one embodiment, the present disclosure includes a method for determining a location of a user. In one embodiment, the method includes receiving operation data including character fields and a first identifier. A query that includes the first identifier is sent to a data store. In response to the query, operation types and corresponding count values are received. Character fields from the operation data are converted into tokens. For each of the tokens, a likelihood value and a second identifier specifying a respective machine learning parameter is retrieved. A machine-learning algorithm is configured based on the count values, and the likelihood values and specified parameters are processed by the configured machine-learning algorithm to determine whether the operation data corresponds to the geographic location of a user.

20 Claims, 7 Drawing Sheets

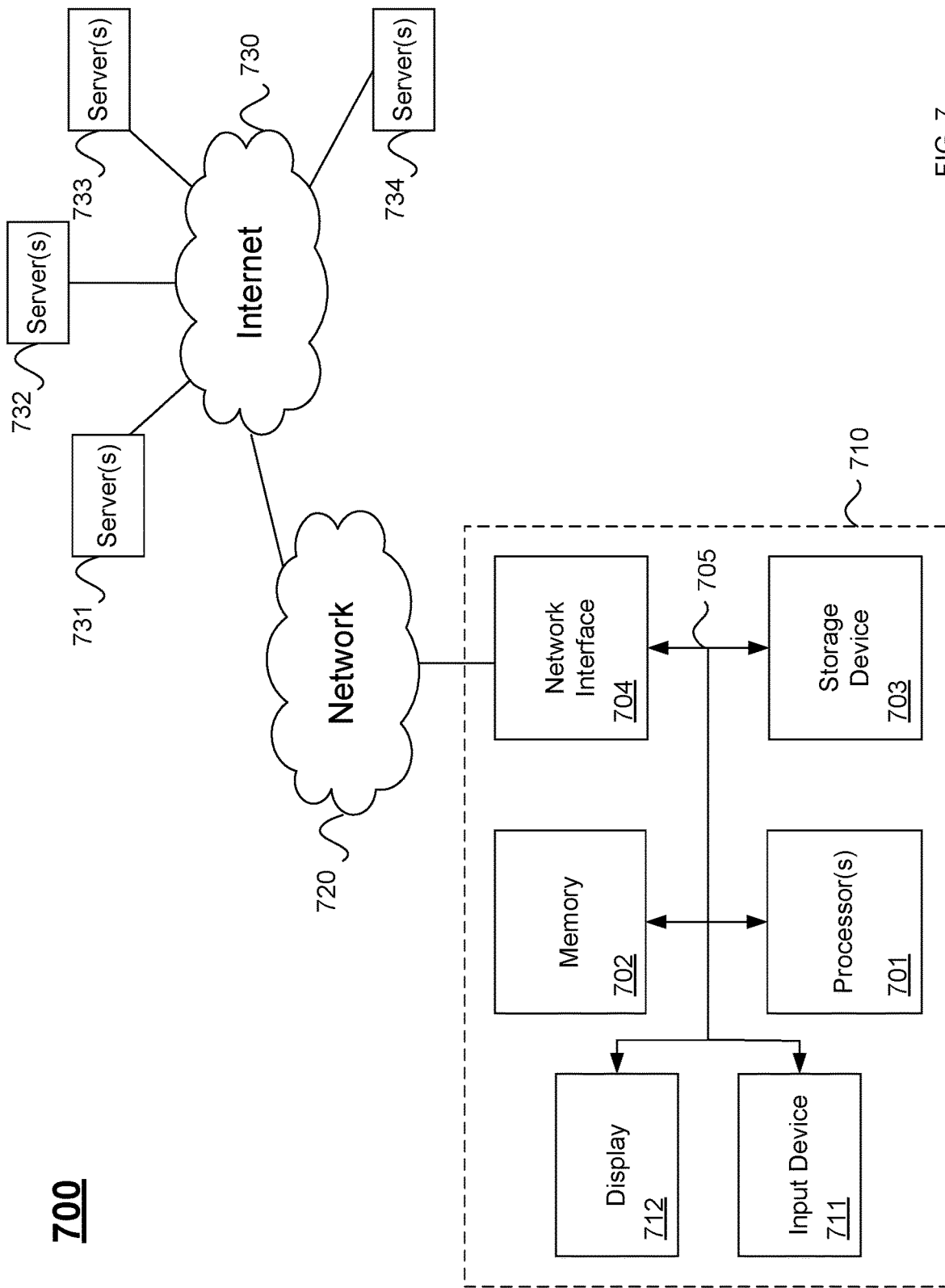

SYSTEMS AND METHODS FOR DETERMINING A GEOGRAPHIC LOCATION

BACKGROUND

The present disclosure relates to computing and data processing, and in particular, to systems and methods for determining a geographic location.

The widespread adoption of using computers for data processing has led to a number of challenges. One challenge stems from the desirability of determining whether operation data indicates a geographic location at which a corresponding operation took place. For example, suppose a person is known to be in a region in which a threat to the person's wellbeing, such as a natural disaster or terrorist attack, has occurred. The person's family, friends, or employer may wish to warn the person of the threat, or to assist the person in withstanding or escaping the threat. But if traditional means of contacting or locating the person are unavailable (e.g., cell service is down in the region or the person otherwise has no functioning smart phone), then one option is to locate the person (transactor) by determining a location at which the person recently performed a data operation (e.g. a transaction with a credit card or debit card). Unfortunately, even if operation data transmitted to the card provider indicates a geographic location of the other party (e.g., a merchant) to the operation, the operation data may not, at least on its face, indicate whether the person was at the indicated location when he/she made the operation. Said another way, even if the operation data transmitted to the card provider indicates a geographic location of an entity, the operation data may not, at least on its face, indicate whether the data operation actually occurred at the indicated location. These challenges are compounded, for example, where it was possible for the person to have made the operation while at the indicated geographic location or while at another location. For example, if the entity is a florist, then the operation data may not, at least on its face, indicate whether the person made the operation while he/she was at the florist's place of business, or if he/she made the operation from a different location (e.g., over the phone, online).

SUMMARY

Embodiments of the present disclosure pertain to systems and methods for determining a geographic location from operation data. In one embodiment, the present disclosure pertains to systems and methods for analyzing operation data that indicates a geographic location and for determining whether a data operation with which the operation data is associated occurred at the indicated geographic location. A computing engine receives operation data that includes one or more character fields and a first identifier associated with a geographic location. The computing engine sends, to a data store, a query that includes the first identifier. In response to the query, the data store sends to the computing engine one or more operation types and one or more count values respectively corresponding to the one or more operation types. The computing engine configures a machine-learning algorithm in response to one or more of the one or more count values. The computing engine converts the one or more character fields into one or more tokens. For each of the one or more tokens, the computing engine receives a respective likelihood value and a respective second identifier specifying a respective coefficient, and retrieves each coefficient in response to the respective second identifier. The computing engine executes the machine-learning algorithm to process the one or more retrieved coefficients and the one or more retrieved likelihood values to determine whether the operation data corresponds to the geographic location.

The following detailed description and accompanying drawings provide a better understanding of the nature and advantages of the present disclosure.

BRIEF DESCRIPTION OF THE DRAWINGS

FIG. 7 illustrates hardware of a special purpose computing machine configured to operate and to function according to the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
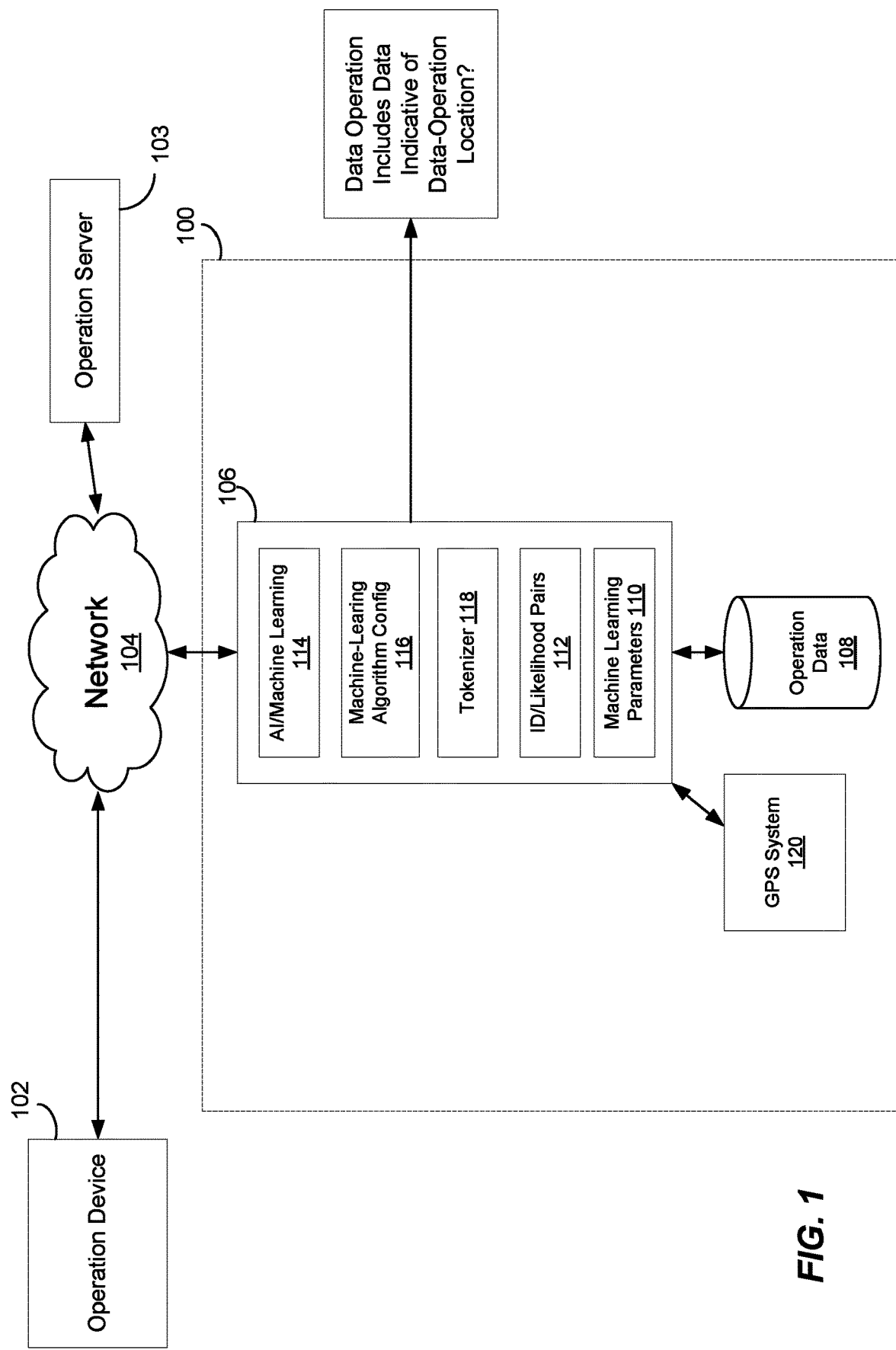
FIG. 1 illustrates an architecture for determining a geographic location indicated by operation data according to an embodiment.

FIG. 1 illustrates an architecture 100 for determining a geographic location indicated by operation data according to an embodiment. Features and advantages of the present disclosure include the architecture 100 automatically determining whether a geographic location indicated in operation data is the geographic location where a person is located. For example, if a person makes a credit-card purchase from a merchant and the credit-card operation data includes an address of the merchant's place of business (e.g., a location), then architecture 100 may automatically determine whether the person made the operation while at the particular location (e.g., by swiping or inserting his/her credit card while at the merchant's place of business), or made the operation from another geographic location (e.g., online) where the person is not located.

The architecture 100 and operation device 102 are configured to communicate with one another via a network 104. Operation device 102 may be located at a geographical location of the data operation, for example. Operation device 102 may be the physical device that performs a operation with a user, for example. Examples of operation device 102 include a card reader, a desktop computer, a laptop computer, a tablet computer, and a smartphone. Operation device 102 may initiate an operation, which may be sent to a backend operation server system 103 (e.g., for authorization and completion) over network 104. Operation server 103 may send operation data to engine 406, for example. Examples of the network 104 include the Internet and a combination of the Internet and one or more local-area networks (LANs).

The architecture 100 is configured to determine whether a geographic location indicated by operation data from operation device 102 is the geographical location at which the data operation occurred and where the user is physically present, for example. For instance, if the operation data indicates a geographic location (e.g., a street address) of an entity (e.g., a merchant), then the architecture 100 is configured to determine whether the data operation occurred at the indicated geographic location and/or whether or not the person performing the operation is physically present at that location, for example.

The architecture 100 includes a computing engine 106 and operation data store 108. The computing engine 106 is configured to determine whether a geographic location indicated by operation data from the operation device 102 is the geographic location where the data operation occurred and/ or user was present. The computing engine 106 includes, or is otherwise configured to implement, an artificial-intelligence/machine-learning algorithm (hereinafter "machine-learning algorithm") 114, a machine-learning-algorithm configuration component 116, and a tokenizer 118. In some embodiments, computing engine 106 may access ID/likelihood pairs 112 (e.g., via a lookup table) and parameters 110 for the machine learning algorithm (e.g., coefficients), for example. Additionally, engine 106 may access a GPS system 120, for example.

Operation data store 108 is configured to store an operation data history for each of a number of operation entities (e.g., merchants). Operation data store 108 may be a Hadoop data store, for example, where operation data received from a plurality of operation devices 102 may be stored. The operation history for an entity may include, for each of a number of operation types, a respective number of times that each operation type has occurred over a period of time (e.g., twenty years). For example, operation data may include the name of the entity, a identifier specifying the entity (e.g., a merchant ID), an address of the entity, and information specifying operation types and historical counts. For example, data store 108 may include, for each entity, fields comprising a plurality of operation types and, for each operation type, a historical count of how many times each operation type has been performed. Embodiments of the disclosure may categorize the operation types by whether or not the type of operation occurs at a geographical location indicated by the operation data (e.g., is each operation type an "in person" or "point of sale (POS)" operation or a "remote", card not present "CNP", or "non-POS" operation). For example, suppose the entity is a merchant that delivers groceries and sells, on the premises, hot food and gasoline. The operation history may include fields that specify the number of grocery sales over a period of time, and includes the number of hot-food sales and the number of gasoline sales over the same period of time, for example. For instance, operation data history fields may be as follows: entity name, dba_name (e.g., doing business as), merchant ID, address, and operation type counts, where operation type counts may comprise operation type: count tuples as illustrated by the example in Table 1.

TABLE 1

| Operation Type | Number of Operations |
| --- | --- |
| Purchase Groceries for Delivery | 329 |
| Purchase Hot Food | 10,137 |
| Purchase Gas | 24,988 |

The above described information may be used to improve the ability of a machine learning algorithm 114 to determine if a particular operation may be used to determine the geographic location of a user. For example, when a new data operation is received, the operation may be pre-processed and analyzed by machine learning algorithm 114 to determine if the new operation can be used to determine a geographic location. If the new operation is determined to correspond to a geographic location of a user, then location information associated with the operation may be accessed and used to determine a GPS location of the user from GPS system 120, for example.

In one embodiment, new operation data is pre-processed by tokenizer 118. Operation data may be received as a plurality of characters in a plurality of fields, for example. For instance, operation data may comprise an identifier (e.g., merchant identifier ("MID"), time stamp, entity name (e.g., merchant name), doing business as ("dba") name, entity codes (e.g., MC codes), user information (e.g., the purchaser's information), and other information. Tokenizer 118 may perform some or all of the preprocessing and cleansing steps. For example, in one embodiment, characters from one or more fields may be concatenated, converted to a particular case (e.g., UPPER case), truncated words and abbreviations are converted to a common format (e.g., DWNTN to DOWNTOWN), and otherwise cleansed, for example. The resulting character set is then tokenized, where words are broken into individual tokens (e.g., an array is created by splitting on the spaces in the character string).

In one embodiment, the tokens may be used to access ID/likelihood pairs 112 by engine 106 to obtain inputs for machine learning algorithm 114. For example, each token generated from a new data operation may be used to retrieve one or more likelihood values and an associated identifier. For instance, the identifiers and associated likelihoods may be stored in a lookup table, for example. The values may indicate a likelihood that the token corresponds to the location of the user. For example, the likelihood of a token GAS indicating that a corresponding operation occurred at the geographic location of an entity (e.g., a gas station) may be higher than the likelihood of a token EBAY indicating that a corresponding operation occurred at the geographic location of the entity (e.g., an online auction). The identifiers associated with the tokens may specify parameters 110 to use in the machine learning algorithm. For example, each value in a lookup table may be associated with an identifier specifying a coefficient to use in the machine learning algorithm.

Accordingly, tokens from tokenizer 118 may be used to retrieve values and identifiers corresponding to parameters 110 to be used in the machine learning algorithm 114. The values (or likelihoods) comprise the inputs to the machine learning algorithm (e.g., one likelihood per token) and the parameters (e.g., coefficients) indicate to the machine learning algorithm how to process the input likelihoods for each token (e.g., which coefficient each likelihood is to be combined with). Further, the operation type and associated count information from operation data store 108 may be advantageously used to configure the machine learning algorithm 114 to improve the accuracy of the results. For example, machine learning algorithm configuration component 116 may configure the machine-learning algorithm based on a ratio of one or more of the count values to a sum of all the count values. For example, if particular operation types are POS operations where a user is highly likely to be present (e.g., purchasing GAS), then a ratio of the POS operation types to the total count for all operations may be used to configure the machine learning algorithm and improve performance. For example, using the data in Table 1 above, it can be seen that a ratio of counts for the POS operation types (e.g., hot food and gas) to the total count for all operations is very high (e.g., 0.99). Accordingly, the machine learning algorithm may be configured to reflect that operations from this location are highly likely to be POS operations. A mechanism for configuring a machine learning algorithm based on operation counts is described in more detail below.

Once the machine learning algorithm is configured using the operation count information, for example, the likelihoods and corresponding parameters may be input to the algorithm to produce a result. The result may be a probability that the operation was made with the user present. Accordingly, of the resulting probability is above a threshold, a physical address of the operation may be used to determine a user's location.

Figure 2:
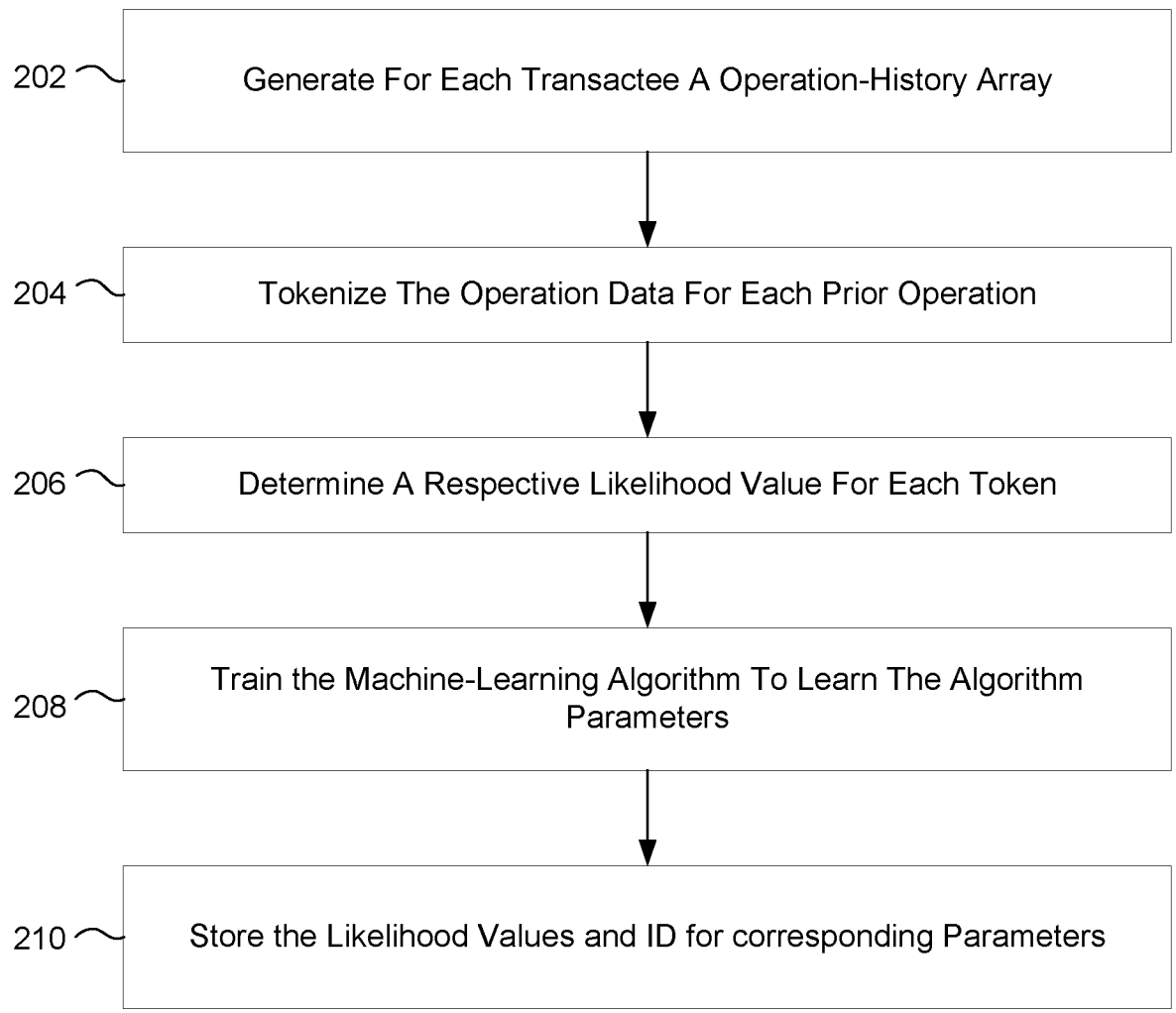
FIG. 2 illustrates a process for initializing and training the architecture of FIG. 1 according to an embodiment.

FIG. 2 is a diagram 200 of a process for initializing and training the computing engine 106 of FIG. 1, according to an embodiment.

Referring to FIGS. 1 and 2, before analyzing operation data from a operation device 102, the computing engine 106 may operates as follows.

At a step 202, the computing engine 106 analyzes the prior operation histories of all entities in one or more operation databases external to the architecture 100. Engine 106 may access operation types and count information from data store 108, for example, and generate, for each entity, an operation-history array comprising operation types and counts for different entities from the operation types and counts described above in conjunction with FIG. 1 and TABLE 1. The operation types may be user-defined expense spend category codes, for example. Engine 106 may store the operation-history arrays in memory, for example.

At a step 204, the tokenizer 118 tokenizes the respective operation data for each operation in the prior histories, and, at a step 206, the computing engine 106 determines a respective likelihood value for each token and stores the likelihood value: ID pairs, for example. For example, likelihood values may be based on a variety of factors, including a number of operations where a particular token is deemed to be POS versus CNP or a "term frequency-inverse document frequency" (herein, "tf-idf"). In tf-idf, the more frequently a token appears in a corpus, the less likely the token is to be relevant (e.g., the words "the" and "is" are used often, but may not convey meaningful information). For example, the tokenizer 118 may weigh the token LLC with a lower tf-idf value because the operation data for many entities includes the abbreviation LLC, and, therefore, the discovery of the token LLC in the operation data is less likely to indicate the type (e.g., onsite or offsite) of the data operation. Conversely, the tokenizer 118 may weight the token GAS with a higher tf-idf value for POS operations because the operation data for fewer entities includes the token GAS, and, therefore, the discovery of the token GAS in the operation data is more likely to indicate the type (e.g., onsite of offsite) of the data operation. For example, a weight of a term in tf-idf may be relative to the classification. For instance, tf-idf may be a HIGH value with respect to POS and a LOW value with respect to CNP operations because the term is frequent in the POS case but inversely it is infrequent in documents associated with CNP operations. In classification problems, the term document may refer to a wide range of entities that are labeled.

After computing and storing the operation-history arrays and the likelihood values, at a step 208, the machine-learning algorithm 114 is subjected to a training process in which the machine-learning algorithm "learns" the above-described equation parameters (e.g., coefficients). For example, the computing engine 106 trains the machine-learning algorithm 114 using the prior-history operation data and the likelihood values in the data store 112 to determine the parameters used to configure the algorithm. In one embodiment, the computing engine 106 may store the parameters in memory at 110. Tokens may be linked to the likelihood values and particular coefficients using a lookup table, for example. Accordingly, when a token is received, a lookup may return a corresponding likelihood and an identifier specifying which parameter 110 to use with the likelihood in the machine learning model, for example.

Figure 3:
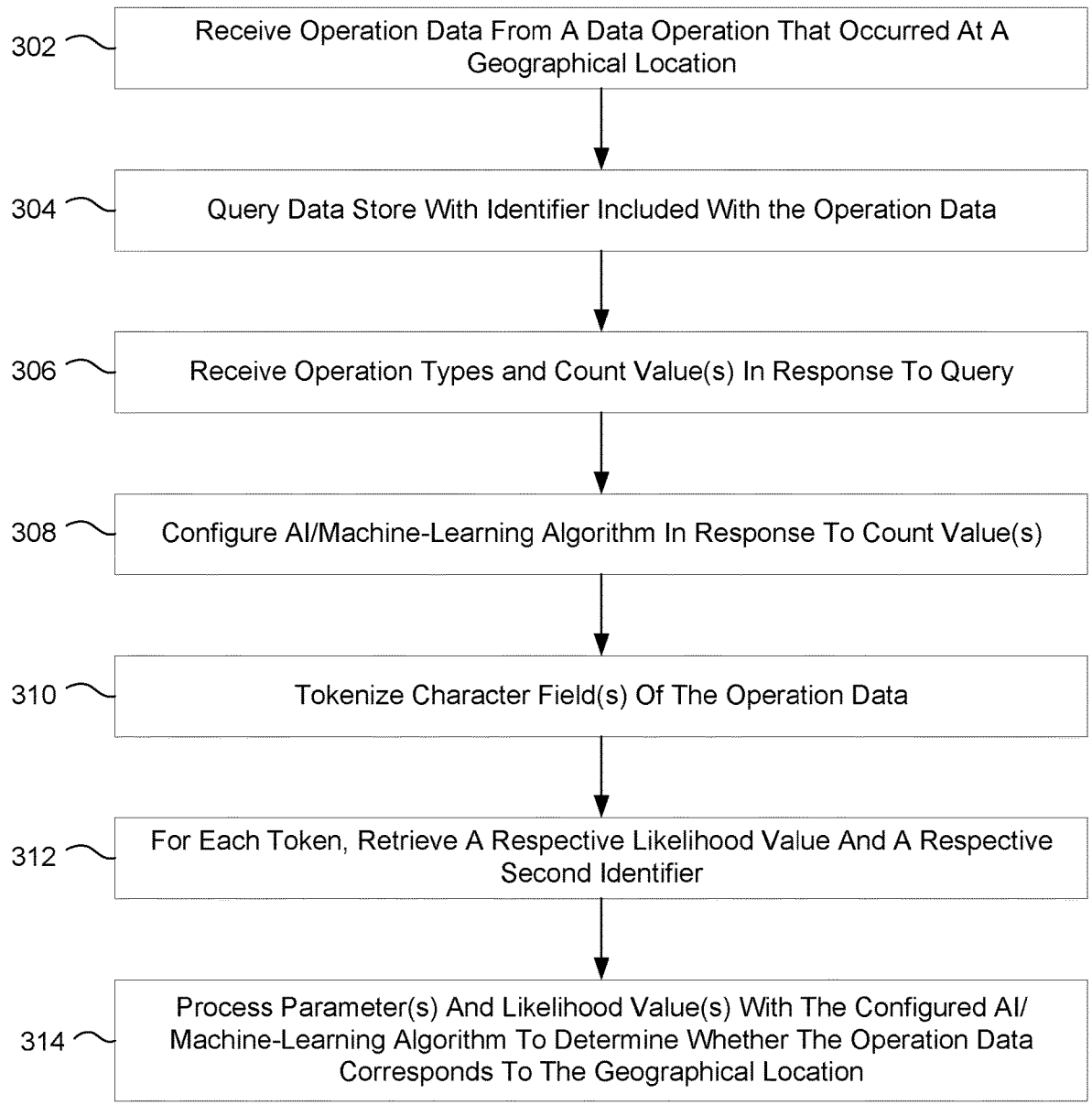
FIG. 3 illustrates a process for determining a geographic location indicated by operation data according to an embodiment.

FIG. 3 is a diagram 300 of a process for determining a geographic location according to an embodiment. FIGS. 1 and 3 show a process for determining whether a geographic location indicated by operation data is the geographic location of a user according to an embodiment.

A data operation is conducted using the operation device 102, and operation data corresponding to the operation is sent to the computing engine 106 via the network 104. For example, the operation device 102, or a computer server coupled to the operation device, transmits the operation data to the computing engine 106 over the network 104.

As described below, the computing engine 106 may determine whether the operation actually occurred at the identified geographical location. In other words, the computing engine may determine whether a user of an operation device 102 is located at an identified geographical location determined as described herein.

At 302, the computing engine 106 receives the operation data from the operation device 102 via the network 104. The operation data includes an identifier specifying an entity (e.g., a merchant). For example, in one embodiment, the identifier may be a merchant identifier (MID). Next, at a step 304, the computing engine 106 generates a query that includes the identifier, and sends the query to the data store 108.

Then, at 306, the data store 108, in response to the query, sends to the computer engine 106 one or more operation types and corresponding count values. For example, the data store 108 may send, to the computer engine 106, the operation types and associated counts shown in TABLE 1 above. In one embodiment, the operation types and associated counts may be stored in an array, for example.

Next, at 308, the machine-learning-algorithm configuration component 116 configures the machine-learning algorithm 114 based on the count values in the received array. Advantageously, embodiments of the present disclosure may "tune" the machine-learning algorithm using operation types and associated counts so that the machine-learning algorithm is more accurate for this particular entity and future similar entities identified by the operation data. For example, the configuration component 116 may compute a ratio of the largest count value (e.g., 24,988 per TABLE 1) for a single onsite operation (e.g., gas purchase per TABLE 1) to the total count value (e.g., 35,454 per TABLE 1) for all operations, and adjust parameters of the machine-learning algorithm 114 with the computed ratio. Alternatively, the configuration component 116 computes the ratio equal to multiple count values for onsite/POS operations (e.g., hot-food and gas purchases per TABLE 1 equal to 35,125) over the total count value (e.g., 35,454 per TABLE 1) for all operations.

At 310, the tokenizer 118 tokenizes the character fields of the received operation data. Tokenizer 118 may perform other data cleansing operations to ensure the characters are in a standardized format for processing, for example.

Next, at 312, the computing engine 106 retrieves a likelihood value and second identifier for each token that the tokenizer 118 generated. For example, likelihood values may comprise inputs to the machine learning algorithm, and each second identifier may be an address of a corresponding coefficient to be used with an associated likelihood, for example.

At 314, the computing engine 106 executes the tuned machine-learning algorithm 114 in response to the retrieved likelihood values and the corresponding coefficients to generate an output value. The output value may be an indicator of how confident the algorithm is that the user was in a location where the operation occurred. For example, the computing engine 106 may compare the output value to a threshold, and determine that a geographic location for the operation may be used for a user's location if the confidence value meets the threshold (e.g., value> or >=threshold) or that the geographic location for the operation may be not used for a user's location if the confidence value does not meet the threshold (e.g., value< or <=threshold). For example, in one embodiment, if the confidence value meets the threshold, then engine 106 may use address information for the entity as the geographic location of the user. If the address information is not included in the operation data, then the first identifier (e.g., the MID) in the operation data may be used to generate a query for address information for the entity, for example. An address associated with the first identifier may be returned, and the geographic location of the user may be set to the address, for example.

In response to determining that the data operation occurred at the geographical location that the operation data identified, the computing engine 106 can determine that the user, and the operation device 102, were located at the identified geographical location at the time of the operation (the computing engine may determine the time of operation from, e.g., an operation time stamp included with the operation data). For example, in one example application the entity is a convenience store, the operation device 102 is a credit-card reader, and the data operation results from the user inserting his/her credit card into the credit-card reader. In response to determining that the operation occurred at the convenience store identified by the MID in the operation data, the computing engine 106 can determine that the person and the credit-card reader were located at the street address of the convenience store at the time of the operation.

Still referring to FIGS. 1 and 3, alternate embodiments and uses of the architecture 100 and of the process for determining a geographic location for a user are contemplated. For example, law enforcement may use the architecture 100 and above-described process to track geographic locations at which a stolen credit card has been used, or to track the movements of a person using a particular purchase card. Alternatively, to prevent such location tracking, the system may be configured so that operation data may not identify a geographical location of the user. As described in more detail below, the geographic location of a user may be obfuscated, for example.

Figure 4:
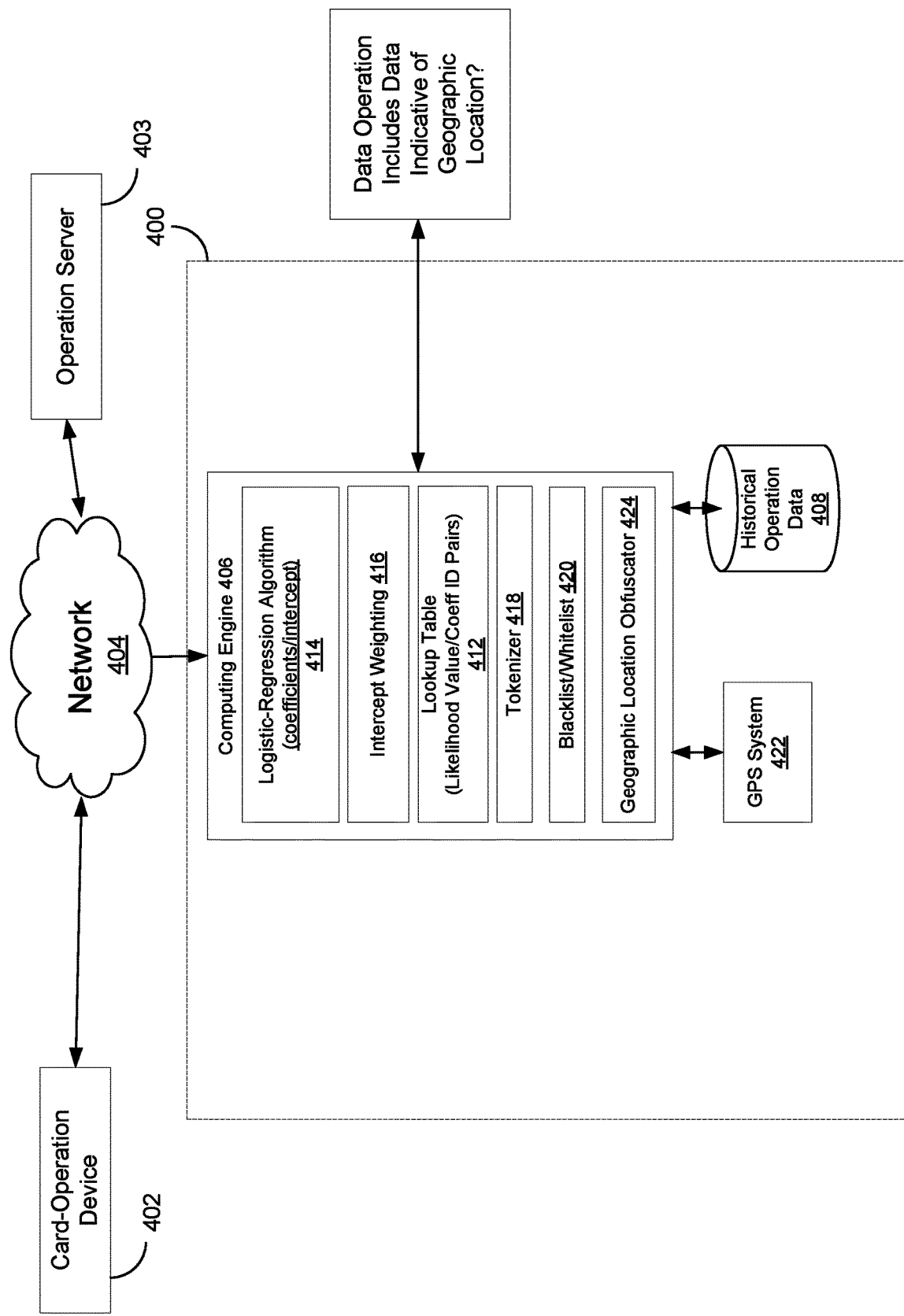
FIG. 4 illustrates an example architecture for determining a geographic location indicated by operation data according to an embodiment.

FIG. 4 illustrates an architecture 400 for determining whether a geographic location indicated by card-operation data is the user's geographic location according to an example embodiment. Features and advantages of the present disclosure include the architecture 400 automatically determining whether a geographic location indicated in card-operation data may be used as the geographic location of a user. For example, if a person makes a credit-card purchase from a merchant and the credit-card operation data includes a merchant identification (MID) that is associated with, or that otherwise specifies, the merchant's address of business, then the architecture 400 can automatically determine whether the person made the operation by swiping/inserting his/her credit card into a card reader while at the merchant's address of business, or made the operation while at a geographic location (e.g., online) other than the merchant's place of business.

The architecture 400 and a card-operation device 402 are configured to communicate with one another via a network 404. The card-operation device 402 is configured to process a card operation, such as a purchase of goods or services, and is, therefore, located at the geographic location at which the card operation takes place. For example, the card-operation device 402 can be a card reader that includes a magnetic head for reading information from a magnetic strip of a operation card (e.g., a credit card, debit card, money card, or gift card) via a swipe of the card, and that includes near-field-communication (NFC) circuitry for reading information from an electronic chip on the card via an insertion of the card. Alternatively, the card-operation device can be a terminal (e.g., a desktop computer, laptop computer, tablet computer, or smart phone) that includes a card-reading peripheral or that otherwise allows one to enter the card number and other card-related information (e.g., a card verification code (CVV)) via an input device (e.g., a keyboard, a voice-to-character transcriber). Card operation device 402 may initiate an operation, which may be sent to a backend operation server system 403 (e.g., for authorization and completion) over network 404. Operation server 403 may send operation data to engine 406, for example. Further, examples of the network 404 include the Internet and a combination of the Internet and one or more local-area networks (LANs).

The architecture 400 is configured to determine whether a geographic location indicated by a card-operation data may be validly used as the geographical location of a user. For example, if the card-operation data is associated with a geographic location (e.g., street address) of a merchant, then the architecture 400 is configured to determine whether the user is physically located at the indicated geographic location.

The architecture 400 includes a computing engine 406, operation data store 408, and may include a GPS system 409 (e.g., local or remote), for example. The computing engine 406 is configured to determine whether card-operation data associated with a card operation entered via, or otherwise processed by, the card-operation device 402 indicates a geographical location at which the card operation occurred. The computing engine 406 includes, or is otherwise configured to implement, an artificial-intelligence/machine-learning algorithm, which in this example is a logistic-regression algorithm 414, an intercept weighting component 416, a lookup table component 412, a tokenizer 418, a black-list-and-white-list component 420, and a geographical-location obfuscator 424.

Operational data store 408 is configured to store a operation history for each of a number of card-accepting merchants. The card-operation history for a merchant includes, for each of a number of card-operation types, a respective number of times that each card-operation type has occurred over a predefined period of time (e.g., twenty years). For example, suppose the merchant is a convenience store that sells floral deliveries (CNP), hot food (POS), and gas (POS). The card-operation history may specify a number of floral sales operations, a number of hot-food sales operations, and the number of gasoline sales operations over a given time period. An example of such a operation-history in data store 408 is as follows:

TABLE 1

| Card-Operation Type | Number of Card-Operations |
|---|---|
| Floral Purchases | 1,137 |
| Hot-Food Purchases | 12,329 |
| Gas Purchases | 19,167 |

In this example, a card swipe at card operation device 402 may trigger a data operation on server 403. Operation data is received in computing engine 406. Initially, the data may be preprocessed by converting the operation data to characters and tokenizing the data at 418, for example. Before or after the tokens are generated, according to different embodiments, blacklist/whitelist filters 420 may be applied. Blacklist filters remove operation data for a known set of merchants where POS sales are always, or nearly always, different from the location of the user. Similarly, whitelists may automatically determine a user's location for a known set of merchants where POS sales are always, or nearly always, the same as the location of the user, for example. Operation data that remains after blacklisting and whitelisting may be processed using a logistic regression algorithm 414. Accordingly, the tokens are sent to lookup table 412 to retrieve corresponding likelihood value/coefficient identifier pairs. The likelihood values are the input values for the logistic regression model, and the coefficient identifiers for each likelihood value specify a particular coefficient to use with the particular likelihood value. Additionally, results are advantageously improved by modifying the parameters of the logical regression model using historical operation data for the particular merchant-type. For example, a ratio may be determined based on counts of sales operation types that are known to be POS operation types (e.g., gas or food). A ratio of one or more POS operation type counts to the total operations at the particular merchant may be used to modify a y-intercept value of the logistic regression model using intercept weighting component 416, for example. Accordingly, the modified logistic regression model 414 receives the likelihood values as inputs, which are combined with trained coefficients specified by the coefficient identifiers, to produce an output value. In one embodiment, when the value is greater than a threshold, the data operation is deemed to indicate the location of the user. Thus, the merchant ID may be used to access the merchants address, and the address may be used as the geographic position of the user at the time of the operation. The address may also be used to retrieve a longitude and latitude from GPS system 422, for example.

Figure 5:
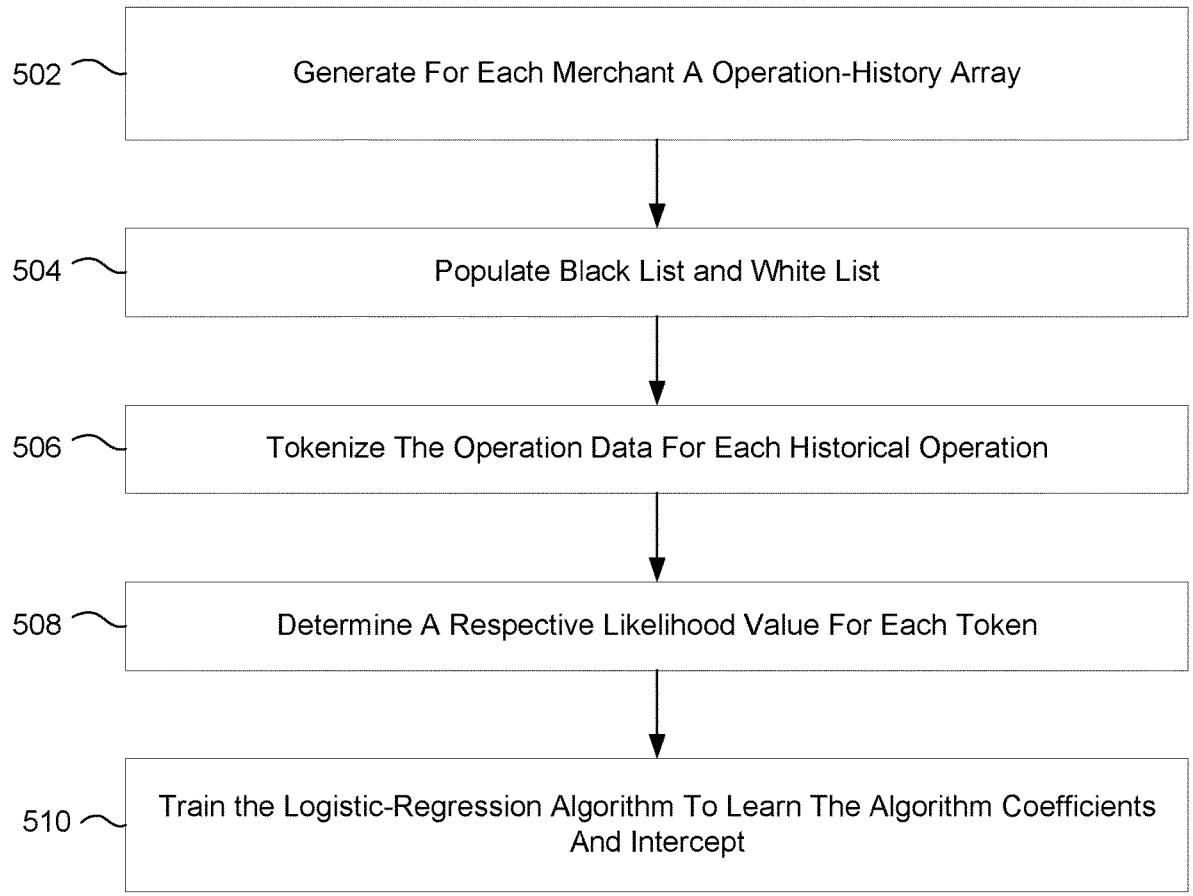
FIG. 5 illustrates a process for initializing and training the architecture of FIG. 4 according to an embodiment.

FIG. 5 is a diagram 500 of an example process for initializing the computing engine 406 and training the logistic regression algorithm of FIG. 4, according to an embodiment.

Referring to FIGS. 4 and 5, before analyzing any card-operation data from any card-operation device 402, the computing engine 406 operates as follows.

At a step 502, the computing engine 406 may analyze the prior card-operation histories of all merchants and generates, for each merchant, an operation-history counts as described above in conjunction with TABLE 2, and stores the operation-history counts in the data store 408.

At a step 504, the computing engine 406 populates a black list and a white list, which may be known business rules, for example.

The black list includes the identities of merchants (e.g., MCC and business name terms) for which virtually all card operations are made at a geographic location that is different than a geographic location indicated by the card-operation data, for example, different than a geographic location associated with a MID.

Conversely, the white list includes the identities of merchants (e.g., MCC and business name terms) for which virtually all card operations are made at a geographic location that is the same as a geographic location indicated by the card-operation data, for example.

At a step 506, for merchant attributes that are not on the blacklist or the whitelist, the tokenizer 418 tokenizes and otherwise cleanses the respective operation data for each operation in the prior histories, and, at a step 508, the computing engine 406 determines a respective likelihood value for each token and stores the likelihood values in the data store 412.

After storing the operation-history counts in the data store 408, computing the likelihood values for the tokens, and storing the likelihood values in the data store 412, at a step 510 the computing engine 406 subjects At 510, the logistic regression algorithm 414 is trained, wherein logistic regression algorithm "learns" equation coefficients and one or more other equation values using a corpus of tokenized operation data with a known result (e.g., the user was or was not in the location of the operation).

For example, the logistic regression model includes a linear regression model and is represented by the following suite of equations:

$$Z = a_1 x_1 + a_2 x_2 + \ldots a_n x_n + \beta + \varepsilon \quad (1)$$

$$\mathrm{sigmoid}(Z) = 1/(1+e^{-z}) \quad (2)$$

where $\alpha_1$-$\alpha_n$ are the coefficients, $x_1$-$x_n$ are the likelihood values for each token, respectively, $\beta$ is the intercept, and $\varepsilon$ is total error. From the above equation it can be seen that particular likelihood values are associated with particular corresponding coefficients. Once trained, new data operations translate tokens into likelihood values (x inputs) and each likelihood values has an associated coefficient identifier to specify which coefficient ($a_i$) to use with each likelihood value ($x_i$). The computing engine 406 may train the model (in a training mode) by finding the values of the coefficients $\alpha_1$-$\alpha_n$ and the intercept $\beta$ that fit a line represented by equation (1) to the known likelihood values $x_1$-$x_n$ with a minimum error $\varepsilon$, which, for example, may be equal to a sum of the squares of the distances between each likelihood value x and the line represented by equation (1).

The computing engine 406 stores the coefficients $\alpha_1$-$\alpha_n$ and the intercept $\beta$ as part of the logistic-regression algorithm 414, for example. Alternatively, the computing engine 406 may store the coefficients and the intercept $\beta$ in another memory location, for example.

Figure 6:
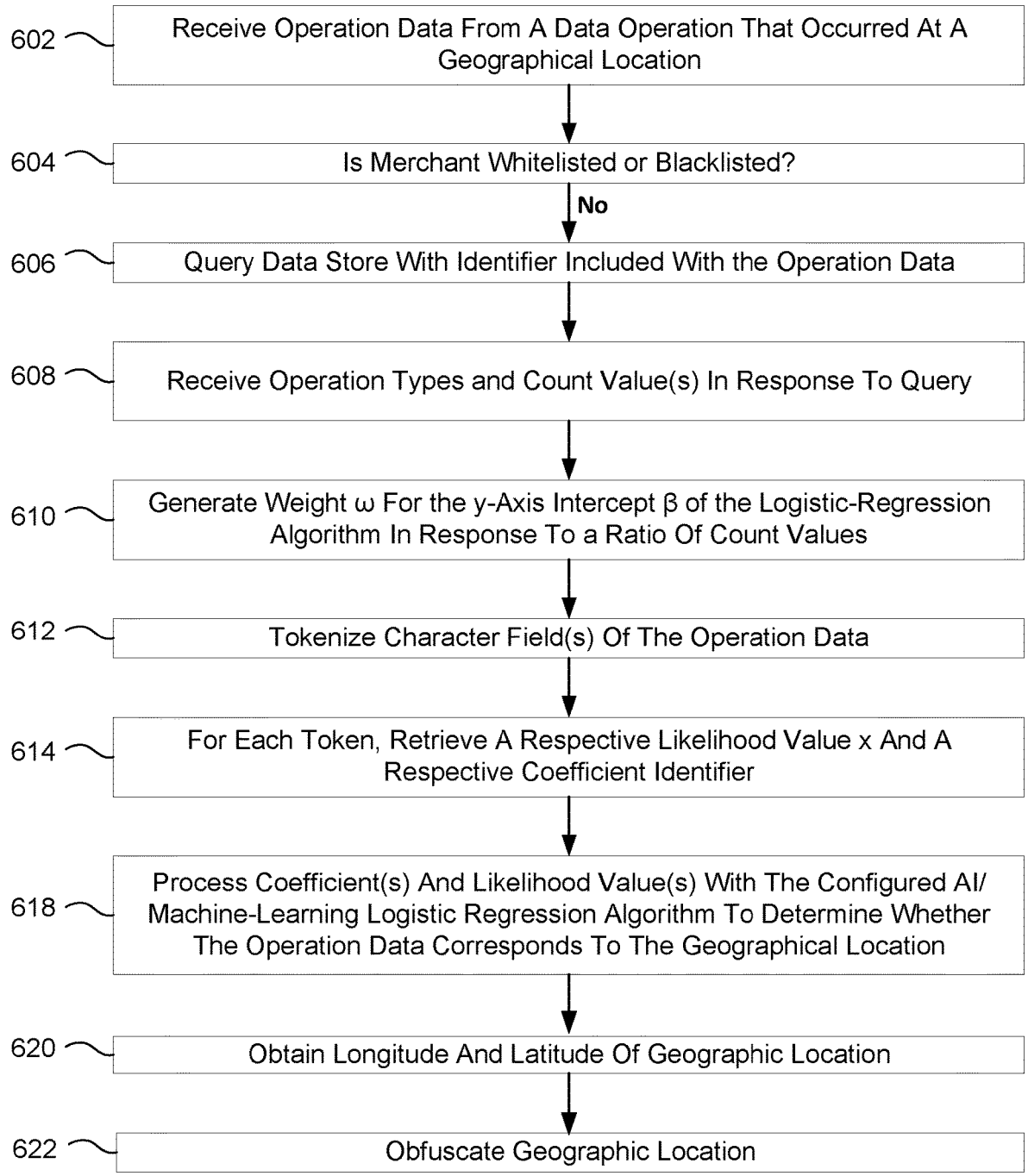
FIG. 6 illustrates an example process for determining a geographic location indicated by operation data according to an embodiment.

FIG. 6 is a diagram 600 of an example process for determining a geographic location of a user according to an embodiment.

Referring to FIGS. 4 and 6, described below is an example process for determining whether a geographic location indicated by card-operation data may be used as a geographic location of a user according to an embodiment.

A card operation is conducted using the card-operation device 402, and card-operation data corresponding to the card operation is sent to the computing engine 406 via the network 404. For example, the card-operation device 402, or a computer server 403 coupled to the card-operation device, transmits the card-operation data to the computing engine 406 via the network 404.

The card-operation data may be associated with a geographical location of a merchant that is a party to the card operation. For example, the card-operation data includes an MID, which may be used to retrieve a geographical location (e.g., an address) of the merchant. Alternatively, one or more character fields of the card-operation data may include, or otherwise identify, a geographic location of the merchant, for example.

As described below, the computing engine 406 determines whether the card operation actually occurred at the geographic location identified by the card-operation data; said another way, the computing engine determines whether the card-operation device 402 is located at the same geographic location that the card-operation data identifies.

At a step 602, the computing engine 406 receives the card-operation data from the card-operation device 402 via the network 404. The card-operation data includes a MID, and the MID, or another part of the card-operation data, may be used to access a geographic location of the merchant, for example.

At 604, the blacklist/whitelist component 420 may compare the merchant attributes with the attributes on the blacklist and on the whitelist, for example. Alternatively, other fields in the operation data or associated with the operation data may be compared with blacklist and whitelist values to determine a match.

If the blacklist/whitelist determiner 420 determines that the MID is blacklisted, then the computing engine 406 generates an indication that the geographic location where the card operation occurred is not the same as the user, for example. After generating such an indication, the computing engine 406 ceases the process until next card-operation data arrives.

If the blacklist/whitelist determiner 420 determines that the MID is whitelisted, then the computing engine 406 outputs an associated geographic location as the geographic location of the user. Alternatively, the computing engine 406 may proceed to step 620, at which the computing engine obtains the longitude and latitude of the geographic location identified by the card-operation data, or may proceed to step 622, at which the computing engine obfuscates the geographic location, for example.

If the blacklist/whitelist determiner 420 determines that the MID included with the card-operation data is neither blacklisted nor whitelisted, then, at a step 606, the computing engine 406 generates a query that includes the MID, and sends the query to the data store 408.

Next, at 608, the data store 408, in response to the query, sends, to the computer engine 406, operation type: count tuples associated with the MID. The tuples include one or more operation types and corresponding count values. For example, the data store 408 may send to the computer engine 406 the operation array of TABLE 2 above.

At 610, intercept weighting component 416 generates a weight $\omega$ for the intercept $\beta$ of the logistic-regression algorithm 414 in response to one or more of the count values in the received operation array. The weight $\omega$ effectively "tunes," and, therefore, makes more accurate, the logistic-regression algorithm for the particular merchant that the MID identifies by adjusting the value of the intercept $\beta$. For example, the weighting component 416 may compute a ratio of the largest count value (e.g., 19,167 per TABLE 2) for an onsite operation (e.g., gas purchase per TABLE 2) to the total count value (e.g., 32,633 per TABLE 2) for all operations, and sets $\omega$ equal to the computed ratio (e.g., 0.587 per TABLE 2). Alternatively, the weighting component 416 computes the ratio equal to the sum (e.g., 31,496 per TABLE 2) of count values for all onsite operations (e.g., hot-food and gas card purchases per TABLE 2) over the total count value (e.g., 32,633 per TABLE 2) for all operations, and sets $\omega$ equal to the computed ratio (e.g., 0.965 per TABLE 2).

At 612, the tokenizer 418 tokenizes the character fields of the received card-operation data, for example, and may perform other data cleansing/preprocessing normalization operations.

At 614, the computing engine 406 retrieves, via lookup table 412, a respective likelihood value x for each token that the tokenizer 418 generated and a corresponding coefficient identifier. For example, each coefficient identifier may be an address specifying a corresponding coefficient $\alpha$ for a particular likelihood x. In one embodiment, the one or more coefficients $\alpha$ already may be stored as part of the logistic regression algorithm 414, or the coefficients may be stored and retrieved from another location, for example.

At 618, the computing engine 406 executes the tuned logistic regression algorithm 414 in response to the retrieved likelihood values x, the corresponding coefficients $\alpha$, the intercept $\beta$, and the intercept weighting factor $\omega$ to generate a value y according to the following equation:

$$y = \alpha_1 x_1 + \alpha_2 x_2 \ldots + \alpha_n x_n + \beta\omega \quad (2)$$

where one or more of the $\alpha x$ pairs may be equal to zero because tokens of a single card-operation data may not include every possible token generated during the training phase described above in conjunction with FIG. 5.

Next, the computing engine 406 computes a confidence value V by mapping a numeric value to range (e.g., 0-1). For example, an output confidence value may be calculated according to the following example mapping equation:

$$V = \mathrm{Sig}(y) = 1/(1+e^{-y}) \quad (3)$$

where Sig(y) is a sigmoid function for which V approaches unity as y approaches infinity, and for which V approaches zero as y approaches negative infinity, for example. Therefore, $0 \leq V \leq 1$, and the value of V is indicative of whether a user is at the geographic location identified by the card operation data, for example.

The computing engine 406 compares the confidence value V to a threshold Th, determines that the user is at the geographic location identified by the card-operation data (e.g., identified by the MID) if the value meets a threshold (e.g., $V \geq Th$), and determines that the card operation did not occur at the identified geographic location if the value does not meet the threshold (e.g., $V < Th$), for example.

In response to determining that the user is located at the geographic location associated with the card-operation data, the computing engine 406 can determine the identified geographical location (e.g., the street address) of the merchant by using the MID to retrieve associated merchant address, for example.

At 620, where the blacklist/whitelist determiner 420, or the logistic regression algorithm 414, determined that the user is at a geographic location indicated by the card-operation data, and where the geographic location is not in longitude/latitude form, the GPS system 422 may be accessed to provide the geographic location. For example, engine 406 may send a street address to GPS system 422 and receive a longitude/latitude in return. In one embodiment, an application interface (API, such as available from Google®), may return the longitude and latitude of the geographic location for a particular address, for example.

At 622, to protect the privacy of the person party to a card operation for which the computing engine 406 determined the user's location, a geographic location obfuscator 424 can obfuscate the determined geographic location. For example, the obfuscator 424 generates a random distance (e.g., between 1.0 kilometer (km) and 9.0 km inclusive), randomly selects a bearing from a predetermined list of bearings (e.g., N, NNW, NW, WNW . . . NNE), and moves the latitude/longitude of the determined geographic location by the randomly generated distance and in the randomly selected direction. If the obfuscated latitude/longitude point is within the same country (or other region) as the determined geographic location, then this new obfuscated latitude/longitude point is saved as the geographic location at which the card operation took place. Otherwise, the process is repeated until the obfuscated latitude/longitude point is within the same country (or other region) as the determined geographic location. If no obfuscated latitude/longitude point can be found within the same country (or other region), then the original, unobfuscated geographic location is saved as the location of the card operation.

HARDWARE

FIG. 7 illustrates hardware of a special purpose computing machine 700 configured according to the above disclosure. The following hardware description is merely one example. It is to be understood that a variety of computers topologies may be used to implement the above described techniques.

An example computer system 710 is illustrated in FIG. 7. Computer system 710 includes a bus 705 or other communication mechanism for communicating information, and one or more processor(s) (e.g., one or more microprocessors or microcontrollers) 701 coupled with bus 705 for processing information. Computer system 710 also includes a memory 702 coupled to bus 705 for storing information and instructions to be executed by processor 701, including information and instructions for performing some of the techniques described above, for example. Memory 702 may also be used for storing programs executed by processor(s) 701. Possible implementations of memory 702 may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device 703 and memory 702 are both examples of non-transitory computer readable storage mediums.

Computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses for coupling various components of the computer together, for example.

Computer system 710 also includes a network interface 704 coupled with bus 705. Network interface 704 may provide two-way data communication between computer system 710 and a local network 720. Network 720 may represent one or multiple networking technologies, such as Ethernet, local wireless networks (e.g., WiFi), or cellular networks, for example. The network interface 704 may be a wireless or wired connection, for example. Computer system 710 can send and receive information through the network interface 704 across a wired or wireless local area network, an Intranet, or a cellular network to the Internet 730, for example. In some embodiments, a browser, for example, may access data and features on backend software systems that may reside on multiple different hardware servers across the Internet 730 on servers 731-734. One or more of servers 731-734 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method, comprising:
    receiving operation data based on a data operation initiated by a user, wherein the operation data includes one or more character fields and a first identifier;
    sending, to a data store, a query that includes the first identifier;
    receiving, in response to the query, one or more operation types and one or more count values respectively corresponding to the one or more operation types, the one or more operation types including purchase types and the count values including a number of card operations;
    setting a first set of parameters of a machine-learning algorithm based on one or more of the one or more count values;
    converting the one or more character fields into one or more tokens;
    retrieving, for each of the one or more tokens, a respective likelihood value and a respective second identifier specifying a respective coefficient;
    setting a second set of parameters of the machine-learning algorithm based on the specified respective coefficients;
    providing the respective likelihood value for each of the one or more tokens as inputs to the machine-learning algorithm, wherein the machine-learning algorithm is configured to generate an output value based on the respective likelihood value for each of the one or more tokens, the first set of parameters, and the second set of parameters; and
    based on the output value, determining whether location information associated with the operation data corresponds to a first geographic location of the user.

2. The method of claim 1 wherein setting the first set of parameters of the machine-learning algorithm is further based on a ratio of one or more of the count values to a sum of all the count values.

3. The method of claim 2 wherein setting the first set of parameters of the machine-learning algorithm includes weighting an intercept value of the machine-learning algorithm with the ratio.

4. The method of claim 1 further comprising retrieving each coefficient in response to the respective second identifier.

5. The method of claim 1 wherein each second identifier includes an address of a storage location at which a respective one of the one or more coefficients is stored.

6. The method of claim 1 wherein determining whether the location information associated with the operation data corresponds to the first geographic location of the user comprises:
  determining that the first geographic location may be used for the user's location if the output value meets a threshold.

7. The method of claim 6 further comprising retrieving an address using the first identifier, wherein the first geographic location of the user is set to the address.

8. The method of claim 1, further comprising, in response to determining that the location information associated with the operation data corresponds to first geographic location of the user, determining a latitude and a longitude in response to the first geographic location.

9. The method of claim 8, further comprising obfuscating the latitude and the longitude.

10. The method of claim 1 wherein the machine learning algorithm is a logistic regression algorithm.

11. A system, comprising:
  one or more processors; and
  a non-transitory machine-readable medium storing a program executable by the one or more processors, the program comprising sets of instructions for:
    receiving operation data based on a data operation initiated by a user, wherein the operation data includes one or more character fields and a first identifier;
    sending, to a data store, a query that includes the first identifier;
    receiving, in response to the query, one or more operation types and one or more count values respectively corresponding to the one or more operation types, the one or more operation types including purchase types and the count values including a number of card operations;
    setting a first set of parameters of a machine-learning algorithm in based on one or more of the one or more count values;
    converting the one or more character fields into one or more tokens;
    retrieving, for each of the one or more tokens, a respective likelihood value and a respective second identifier specifying a respective coefficient;
    setting a second set of parameters of the machine-learning algorithm based on the specified respective coefficients;
    providing the respective likelihood value for each of the one or more tokens as inputs to the machine-learning algorithm, wherein the machine-learning algorithm is configured to generate an output value based on the respective likelihood value for each of the one or more tokens, the first set of parameters, and the second set of parameters; and
    based on the output value, determining whether location information associated with the operation data corresponds to a first geographic location of the user.

12. The system of claim 11 wherein setting the first set of parameters of the machine-learning algorithm is further based on a ratio of one or more of the count values to a sum of all the count values.

13. The system of claim 12 wherein the machine learning algorithm is a logistic regression algorithm, wherein configuring the machine-learning algorithm comprises adjusting an intercept value of the logistic regression algorithm with the ratio.

14. The system of claim 11, wherein the program further comprises a set of instructions for, in response to determining that the operation data corresponds to the first geographic location of the user, determining a latitude and a longitude in response to the first geographic location.

15. A non-transitory machine-readable medium storing a program executable by at least one processor of a computer, the program comprising sets of instructions for:
  receiving operation data based on a data operation initiated by a user, wherein the operation data includes one or more character fields and a first identifier;
  sending, to a data store, a query that includes the first identifier;
  receiving, in response to the query, one or more operation types and one or more count values respectively corresponding to the one or more operation types, the one or more operation types including purchase types and the count values including a number of card operations;
  setting a first set of parameters of a machine-learning algorithm based on one or more of the one or more count values;
  converting the one or more character fields into one or more tokens;
  retrieving, for each of the one or more tokens, a respective likelihood value and a respective second identifier specifying a respective coefficient;
  setting a second set of parameters of the machine-learning algorithm based on the specified respective coefficients;
  providing the respective likelihood value for each of the one or more tokens as inputs to the machine-learning algorithm, wherein the machine-learning algorithm is configured to generate an output value based on the respective likelihood value for each of the one or more tokens, the first set of parameters, and the second set of parameters; and
  based on the output value, determining whether location information associated with the operation data corresponds to a first geographic location of the user.

16. The non-transitory machine-readable medium of claim 15 wherein setting the first set of parameters of the machine-learning algorithm is further based on a ratio of one or more of the count values to a sum of all the count values.

17. The non-transitory machine-readable medium of claim 15 wherein the machine learning algorithm is a logistic regression algorithm, wherein configuring the machine-learning algorithm comprises adjusting an intercept value of the logistic regression algorithm with the ratio.

18. The non-transitory machine-readable medium of claim 15 wherein determining whether the location information associated with the operation data corresponds to the first geographic location of the user comprises:

determining that the first geographic location may be used for the user's location if the output value meets a threshold.

19. The non-transitory machine-readable medium of claim 18, wherein the program further comprises a set of instructions for retrieving an address using the first identifier, wherein the first geographic location of the user is set to the address.

20. The non-transitory machine-readable medium of claim 15, wherein the program further comprises a set of instructions for, in response to determining that the location information associated with the operation data corresponds to first geographic location of the user, determining a latitude and a longitude in response to the first geographic location.

* * * * *